May 5, 1936.   T. W. LOWE   2,039,968
METHOD OF MANUFACTURING PIPE BENDS
Filed March 27, 1935   2 Sheets-Sheet 1
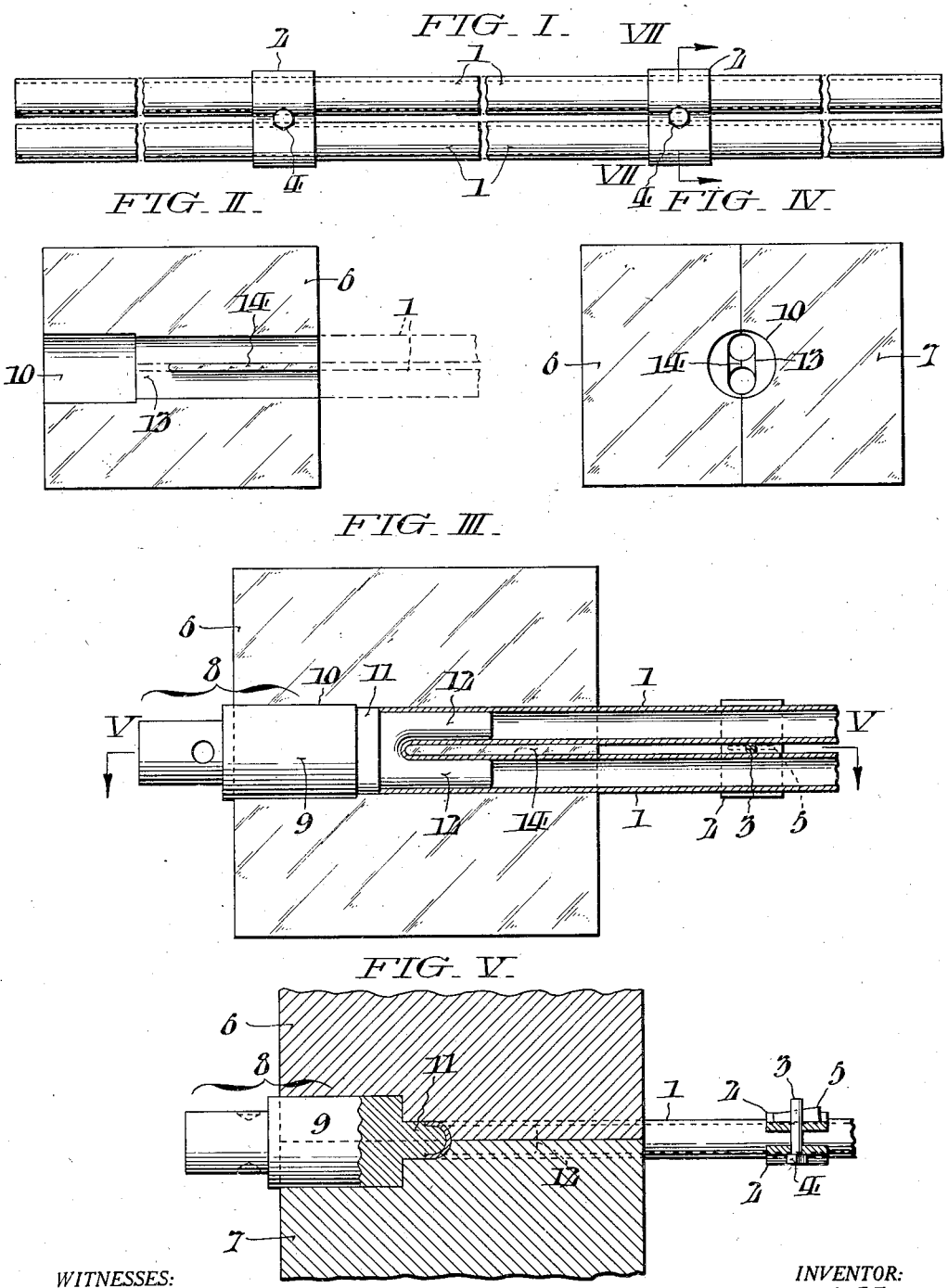
WITNESSES:
INVENTOR:
Thomas W. Lowe,
BY
ATTORNEYS.

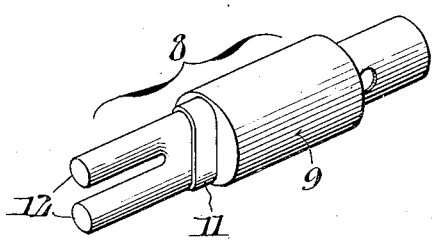
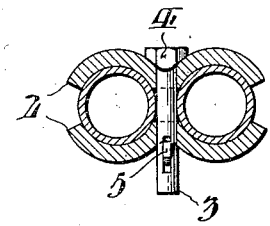
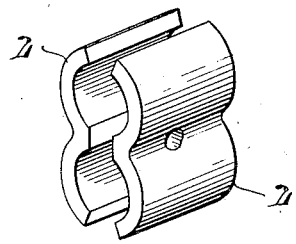
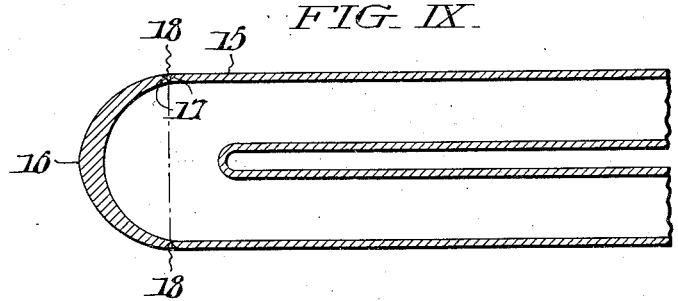
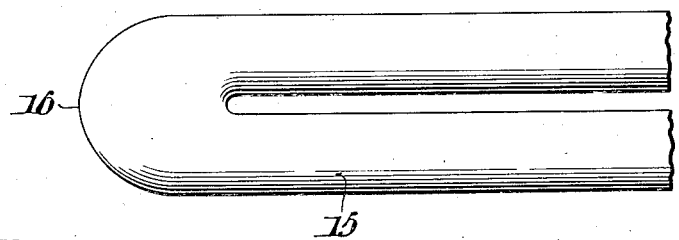

Patented May 5, 1936

2,039,968

UNITED STATES PATENT OFFICE 2,039,968

METHOD OF MANUFACTURING PIPE BENDS

Thomas W. Lowe, Columbus, Ohio

Application March 27, 1935, Serial No. 13,248

1 Claim. (Cl. 29—157.6)

This invention relates to a method of manufacturing pipe bends, and is particularly adapted to the making of pipe bends for locomotive superheaters, though it may be applied to many other like purposes.

Heretofore various schemes have been proposed for making superheater return bends. Some of the proposed methods involve difficult or laborious operations. Others require the manufacture and assembly of a number of specially formed sections, and still others result in the production of a return bend in which obstructions are presented which prevent the smooth passage of the steam around the bend.

The principal objects of the present invention are to avoid the difficulties which have been experienced with older forms of return bends, and particularly to simplify the operations involved in manufacture, and to reduce the expense thereof, and at the same time to provide a return bend which has substantial strength and which presents a smooth unobstructed passage for the flow of steam.

Other more specific objects and advantages characterizing my invention will become more fully apparent from the description hereinafter set forth of one embodiment or example of the practice of the invention, having reference to the accompanying drawings. Of the drawings:

Fig. I represents a pair of pipe sections clamped together in readiness for the first step of the process of my invention.

Fig. II represents a side elevation of a die of a forging machine, showing in dot-and-dash lines the initial position assumed by the pipe sections when inserted therein.

Fig. III represents a similar view drawn to a larger scale showing the plunger entering the die to forge the pipe ends.

Fig. IV represents an end elevation showing both dies of the forging machine, with the plunger removed.

Fig. V represents a cross section of the same, taken as indicated by the lines V—V of Fig. III.

Fig. VI represents a perspective view of the plunger.

Fig. VII represents a cross section of the pipe ends, taken as indicated by the lines VII—VII of Fig. I, and showing the preferred form of clamp for holding the pipe sections together.

Fig. VIII represents a perspective view of one of the clamps.

Fig. IX represents a longitudinal cross section of the pipe sections after application of the return bend cap which constitutes the final step of the process; and, Fig. X represents a side elevation of the pipe sections with the return bend cap applied thereto.

In the drawings there is shown an example of the invention as applied to the manufacture of return bends for locomotive superheaters. As shown in Fig. I, the first step of the process consists in clamping a pair of pipe sections 1 in spaced parallel relation. For this purpose, I conveniently employ pairs of spacer clamps of the type shown in detail in Figs. VII and VIII. Each clamp 2 is secured to its mate by means of a bolt 3, the head 4 of the bolt engaging one of the clamps of the pair and a wedge-shaped key 5 passing through a slot in the opposite end of the bolt and engaging the other clamp. In this manner the two pipe sections 1 are maintained in rigid spaced relation to each other.

The pipe sections 1, when clamped together in the manner shown, are heated in a furnace and then inserted in a die forging machine, the dies of which are represented in Figs. II to V, at 6, 7. For convenient handling of the pipe sections to carry them from the heating furnace to the die forging machine, tongs or like instrumentalities may be employed. When inserted in the die forging machine, the pipe sections 1 occupy the position represented in dot-and-dash lines in Fig. II. As shown clearly in Figs. III and V, the plunger 8 of the die forging machine is preferably formed with a cylindrical head 9 which fits within a correspondingly shaped cylindrical cavity 10 formed between the dies 6, 7. In advance of the head 9 the plunger is provided with a substantially oval shaped shoulder 11, and from this shoulder there projects forwardly two legs 12 which are adapted to enter into the ends of the pipe sections 1. The dies 6, 7 form between them a cavity 13 which corresponds in shape to the shape of the return bend which it is desired to form at the ends of the tube sections. Within this cavity 13 there is a rib 14, the end of which defines the arch of the return bend.

When the plunger 8 of the die forging machine is operated to deliver a blow upon the clamped pipe sections, the legs 12 enter the ends of the pipes and the shoulder 11 strikes the edges thereof, displacing the metal and causing it to spread throughout the cavity 13 and thus to assume the desired shape. As an incident to the forging of the ends of the pipe sections, the metal of the one pipe is integrally united with the metal of the companion pipe, and thus the body of the return bend is formed. Moreover, the forging of the pipe sections in this manner compacts the metal giving to it added strength at the critical regions where strength is most desired.

When the clamped pipe sections 1 are removed from the die forging machine, the ends thereof have been forged to form a return bend body of the shape represented at 15 in Fig. IX. It will thus be seen that during the forging operation, the ends of the pipe sections are transformed into an integral body 15 comprising two cylindrical legs merging into a single tube of substantially oval cross section.

The return bend cap, represented at 16 in Figs. IX and X, is forged in a separate operation. A preferred method of forging the return bend cap 16 forms the subject of my pending patent application, Serial Number 13,247, filed March 27, 1935. Both the cap 16 and the return bend body 15, prior to assembly, are cut off square and bevelled at their edges as indicated at 17. The final operation consists in applying the cap 16 to the return bend body 15 by an autogenous weld, as indicated at 18.

It will be especially noted that the operation of the plunger 8, as clearly shown in Fig. III, involves a longitudinal slitting of a portion of the wall of each pipe section 1, with incidental spreading of the regions adjacent to the slit, and displacement of the metal to correspond to the shape of the die cavity 10, and subsequent uniting of the pipe ends whereby they are merged into an integral return bend body. Differing from methods heretofore employed, the present invention is characterized by a longitudinal slit which extends only for a relatively short distance from the end of each pipe section 1, as compared to the diameter of the pipe. The use of a separate cap piece 16 welded to the return bend body and of a type which can readily be made to any desired rounded configuration, makes it unnecessary to resort to a deep slit, and thus relieves the cooperating die and plunger and the pipe sections of the sort of sever working required where pipes are slit and radically distorted for a substantial portion of their length. At the same time the further advantage is gained that the cap piece, which is the part of the return bend subject to the greatest wear, may be provided with additional thickness of metal at the base thereof.

It will also be apparent that the completed job presents clean forged metal without gather or weld at the hottest point, that is, the extreme end of the tip of the return bend, and that the herein described construction results in an unobstructed passage for the steam around the bend.

The cap portion 16 of the return bend may be easily repaired when burned or worn away. It is a simple matter to cut off a worn cap and weld on a new one, at the same time inspecting the interior of both pipes to be sure that they are free of lime or other obstructions.

While I have described one example of the practice of my invention showing particular forms of dies which may be used to advantage in the manufacture of return bends for locomotive superheaters, it will be apparent that numerous changes may be made in the form of the apparatus employed, and that the invention has obvious application to the making of pipe bends for other purposes; and such changes are within the spirit of the invention as defined in the annexed claim.

Having thus described my invention, I claim:

A method of manufacturing pipe bends for superheaters or the like which comprises heating a pair of pipe sections, forging the ends of said pipe sections with incidental slitting of the wall of each pipe section longitudinally and displacement of the metal to merge the pair of pipe sections into a return bend body having a single opening at the end thereof, the longitudinal slit extending for a relatively short distance from the end of each pipe section as compared to the diameter of the pipe section, trimming the edges of the body at said opening, and welding a cap to said edges.

THOMAS W. LOWE.